United States Patent
Bradshaw et al.

(10) Patent No.: US 7,484,216 B2
(45) Date of Patent: *Jan. 27, 2009

(54) SYSTEM AND METHOD FOR DECOUPLING SPACE RESERVATION IN TRANSACTIONAL LOGGING SYSTEMS

(75) Inventors: Dexter Paul Bradshaw, Duvall, WA (US); Surendra Verma, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 596 days.

This patent is subject to a terminal disclaimer.

(21) Appl. No.: 10/175,439

(22) Filed: Jun. 18, 2002

(65) Prior Publication Data

US 2003/0233389 A1 Dec. 18, 2003

(51) Int. Cl.
*G06F 12/00* (2006.01)
*G06F 11/00* (2006.01)

(52) U.S. Cl. .............. 718/104; 707/202; 707/203; 707/204; 707/205; 714/19

(58) Field of Classification Search .......... 718/104, 718/101, 106; 707/1–10, 203, 201, 202; 711/170; 719/311; 709/213–219, 201–207; 714/19
See application file for complete search history.

(56) References Cited

U.S. PATENT DOCUMENTS

| | | | | |
|---|---|---|---|---|
| 5,210,872 A | * | 5/1993 | Ferguson et al. | 718/102 |
| 5,303,369 A | * | 4/1994 | Borcherding et al. | 718/104 |
| 5,408,663 A | * | 4/1995 | Miller | 718/104 |
| 5,421,011 A | * | 5/1995 | Camillone et al. | 718/104 |
| 5,682,477 A | * | 10/1997 | Wakamiya et al. | 705/30 |
| 5,737,600 A | * | 4/1998 | Geiner et al. | 707/200 |
| 5,742,772 A | * | 4/1998 | Sreenan | 709/226 |
| 5,802,396 A | * | 9/1998 | Gray | 710/20 |
| 5,826,082 A | * | 10/1998 | Bishop et al. | 718/104 |
| 5,832,508 A | * | 11/1998 | Sherman et al. | 707/200 |
| 5,909,540 A | * | 6/1999 | Carter et al. | 714/4 |
| 6,003,061 A | * | 12/1999 | Jones et al. | 718/104 |
| 6,125,393 A | * | 9/2000 | Clark et al. | 709/224 |
| 6,246,678 B1 | * | 6/2001 | Erb et al. | 370/352 |
| 6,321,234 B1 | * | 11/2001 | Debrunner | 707/202 |
| 6,701,420 B1 | * | 3/2004 | Hamilton et al. | 711/170 |
| 6,732,124 B1 | * | 5/2004 | Koseki et al. | 707/202 |
| 6,850,942 B2 | * | 2/2005 | Cotner et al. | 707/10 |
| 2002/0099843 A1 | * | 7/2002 | Fruchtman et al. | 709/232 |

OTHER PUBLICATIONS

*ARIES: A Transaction Recovery Method Supporting Fine-Granularity Locking and Partial Rollbacks Using Write-Ahead Logging;* C. Mohan, IBM Almaden Research Center, Don Haderle, IBM Santa Teresa Laboratory and Bruce Lindsay, Hamid Pirahesh and Peter Schwarz, IBM Almaden Research Center; ACM Transactions on Database Systems, vol. 17, No. 1, Mar. 1992.

* cited by examiner

*Primary Examiner*—Meng-Ai An
*Assistant Examiner*—Charles E Anya
(74) *Attorney, Agent, or Firm*—Merchant & Gould PC

(57) ABSTRACT

A common logging system (a "virtual logging system") that presents to one or more log clients the appearance that each log client is interacting with a dedicated logging system. In reality, the virtual logging system is multiplexing virtual log streams, including log records, for each log client into a single transactional log. In particular, the invention is directed at a system and method for decoupling space reservation between a plurality of distributed components and a core component in the virtual logging system.

18 Claims, 7 Drawing Sheets

SYSTEM AND METHOD FOR DECOUPLING SPACE RESERVATION IN TRANSACTIONAL LOGGING SYSTEMS

BACKGROUND OF THE INVENTION

The notion of a transaction is an important concept for transactional systems, such as database management systems, recoverable file systems and transaction-based operating systems. Briefly stated, a transaction is an action or set of actions that guarantees the ACID (Atomicity, Consistency, Isolation and Durability) properties. Transactional logging involves maintaining a persistent transactional log that records a time serial history of transactions in a system. A transactional log provides information for restoring a system to a consistent state that existed prior to a system failure.

A traditional transactional logging system uses a dedicated log to support a single log client. The log client communicates with the transactional logging system to ensure that the client's log records are properly written to the dedicated log. This type of transactional logging system is typically very robust and achieves a high level of reliability. However, the inventors have determined that the high level of reliability of a single log client using a dedicated logging system may actually result in overall performance degradation for a computing environment where multiple log clients are using multiple dedicated logging systems.

One of the reasons for the performance degradation is that each dedicated logging system independently incurs input/output (I/O) overhead to write and retrieve information from its respective dedicated log. This and other I/O overhead results in adverse performance impact, and the impact is cumulative for each of the independent logging systems. An improved logging system is desirable that could overcome some of these performance problems.

However, the development of an improvement to the existing scheme of transactional logging has met several hurdles. The inventors have determined that one hurdle to an improved transactional logging system is the need to assure that a client's log records are reliably written to a transactional log by guaranteeing the availability of space in the log. A solution that offers this guarantee without incurring undue context switching and I/O overhead continues to elude those skilled in the art.

SUMMARY OF THE INVENTION

Briefly stated, this invention is directed toward a computer-implemented system and method for decoupling space reservation in a transactional logging system. The transactional logging system handles log records for multiple clients and comprises distributed components, a core component, and a transactional log. The core component allocates a part of the transactional log as common reserved space for use by the clients. Each of the distributed components interacts with one of the clients. The distributed component maintains accounting information for identifying the client's portion of the common reserved space. The accounting information is communicated to the core component by the distributed component.

In one aspect, the invention is directed toward a computer-implemented system and method for pre-reserving space in a common transactional log. The computer-implemented method includes receiving log records from clients that use the transactional log. The method determines whether a sufficient amount of free space exists in the transactional log to append the log records. If not, the log records are appended to pre-reserved space associated with the client in the transactional log. The method updates an amount of pre-reserved space available to the client.

In another aspect, the invention is directed toward a method for communicating between a distributed component and a core component in a transactional logging system. The distributed component, which is associated with a client, issues a first message that contains a requested amount of pre-reserved space in a transactional log. The core component receives the first message and determines how much free space in the transactional log to make available to the client as pre-reserved space. The core component returns to the distributed component a second message that identifies the actual amount of pre-reserved space.

In still another aspect, the invention is directed toward a computer-readable medium encoded with a transactional log that has at least two data fields. The first data field contains log records. Each log record is associated with one of the clients that uses the transactional log. The second data field contains accounting information associated with common reserved space shared by the clients.

In yet a further aspect, the invention is directed toward a computer-readable medium encoded with a data structure that has at least two data fields. The first data field identifies an amount of current pre-reserved space and an amount of desired pre-reserved space associated with a distributed component of a transactional logging system. The second data field identifies an amount of actual pre-reserved space available to the distributed component.

DETAILED DESCRIPTION OF THE PREFERRED EMBODIMENT

Briefly stated, the present invention enables a common logging system (a "virtual logging system") that presents to one or more log clients the appearance that each log client is interacting with a dedicated logging system. In reality, the virtual logging system is multiplexing virtual log streams, including log records, for each log client into a single transactional log. In particular, the invention is directed at a system and method for decoupling space reservation between a plurality of distributed components and a core component in the virtual logging system.

Figure 1:
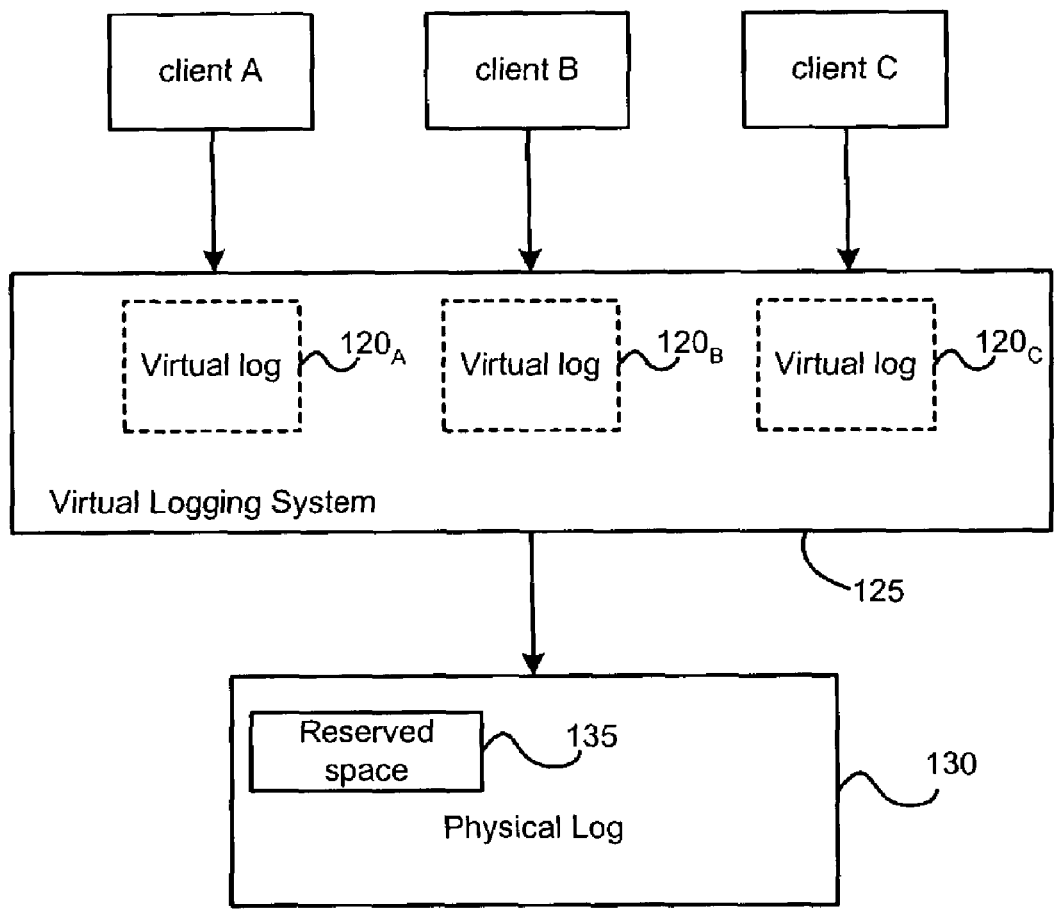
FIG. 1 illustrates a graphical overview of a virtual logging system in accordance with the invention.

FIG. 1 illustrates a graphical overview of a virtual logging system in accordance with the invention. As shown in the figure, virtual logging system 125 provides transactional logging services to each of multiple clients, such as clients A, B and C. Each client is a computer application program that maintains a log through the virtual logging system. Examples of the clients may be a database application, a transactional file system, or the like. Virtual logging system 125 provides the illusion to each of clients A, B, and C that a separate, dedicated log is being maintained for each client. In other words, clients A, B, and C send log records to the virtual logging system 125 with the expectation that the log records are stored in dedicated logs. For the purpose of this discussion, the illusory dedicated logs are referred to as "virtual logs," represented in the figure as virtual logs $120_{A-C}$. In actuality, the virtual logging system 125 multiplexes and appends the log records from each client to a single physical log 130.

Physical log 130 is the allocated space in a storage unit to which log records multiplexed by virtual logging system 125 may be appended. To ensure that sufficient space is available in physical log 130 for appending log records, undo records and compensation log records in virtual log $120_{A-C}$, space 135 may be reserved in physical log 130.

Figure 2:
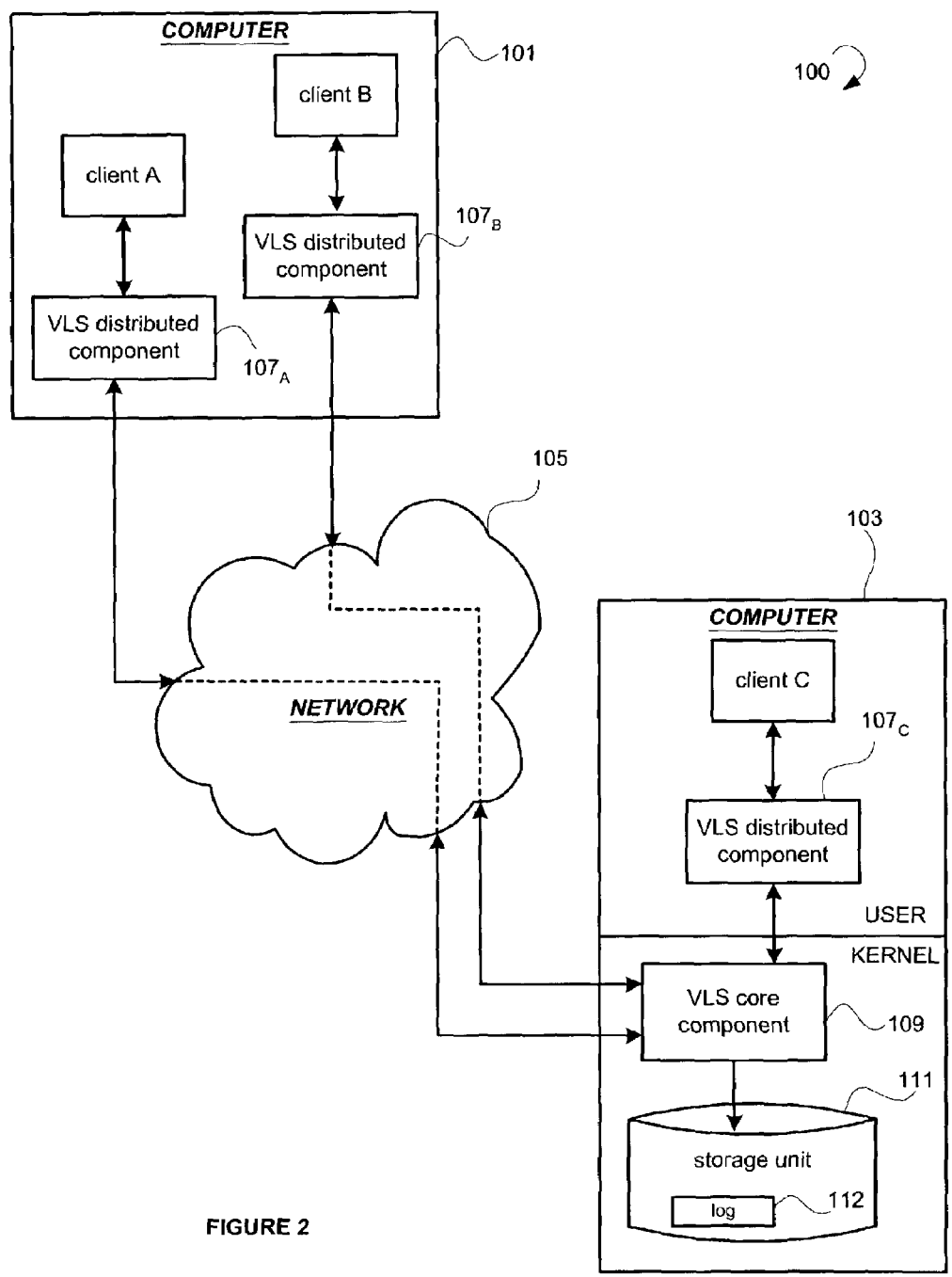
FIG. 2 shows an exemplary inter-network virtual logging system that implements this invention.

FIG. 2 shows an exemplary inter-network virtual logging system 100 that implements this invention, according to one embodiment of the invention. In other configurations, inter-network virtual logging system 100 may include many more components than those shown. As shown in the figure, inter-network virtual logging system 100 includes distributed components $107_{A-C}$ and a core component 109.

Distributed components $107_{A-C}$ are parts of inter-network virtual logging system 100 that directly communicate with their corresponding log clients A, B, and C. Distributed components $107_{A-C}$ may be implemented as objects that can be called by their corresponding clients for logging services. As shown in the figure, log clients A and B execute on computer 101, and log client C executes on computer 103. Clients A and B may execute either in the user mode or the kernel mode of computer 101. In this example, client C is shown as executing in the user mode of computer 103 for illustrative purposes. It is to be appreciated that client C may also be implemented in the kernel mode of computer 103.

Distributed components $107_{A-C}$ are configured to maintain accounting information regarding reserved space, pre-reserved space, and desired pre-reserved space. Reserved space, pre-reserved space, and desired pre-reserved space will be discussed in more detail in FIG. 4. Briefly stated, reserved space is the amount of space in the transactional log that is reserved by a distributed component for undo records and compensation log records. Pre-reserved space is the amount of space in the transactional log that is pre-reserved by the distributed component to ensure that log records and reservation requests, once received and accepted, will not fail to be appended to the transactional log due to a lack of free space. Desired pre-reserved space is the amount of space in the transactional log that the distributed component would like to pre-reserve.

Core component 109 is the central component of virtual logging system 100. It writes log records to a transactional log 112 stored in storage unit 111. Core component 109 may be implemented as a part of a computer's kernel. As shown in the figure, core component 109 interacts with distributed components $107_{A-C}$.

Storage unit 111 may include any storage medium or device, such as a hard disk, a CD-writer, non-volatile RAM, etc. Network 105 may be any network capable of connecting computers. Examples of network 105 include a local area network (LAN) and a wide area network (WAN), such as the Internet.

In operation, distributed components $107_{A-C}$ and core component 109 of virtual logging system 100 work in conjunction to provide logging service to clients A, B, and C. Each of the distributed components $107_{A-C}$ receives log records from its corresponding client and represents to the client that the log records will be written to a dedicated log (i.e. a virtual log). Actually, the distributed component buffers the received log records and, at the appropriate time, transmits the log records to core component 109. Distributed components $107_{A-C}$ may communicate with core component 109 through any communication mechanisms, such as TCP/IP, datagrams, Wi-Fi, Bluetooth, application-based high speed interconnects, remote procedure calls (RPC), etc. Core component 109 receives the log records from distributed components $107_{A-C}$ and multiplexes the log records into a transactional log 112.

As shown in the figure, distributed components $107_{A-C}$, which directly interact with clients A-C, are decoupled from core component 109, which handles transactional log 112. This decoupling necessitates communications between the components, which may degrade the performance of virtual logging system 100. In particular, communicating between distributed component $107_C$ and core component 109 involves crossing a user-kernel boundary; communicating between distributed component $107_{A-B}$ and core component 109 involves crossing the machine boundary. Communications that cross these boundaries incur significant system overhead.

The present invention reduces system overhead by avoiding constant communication between distributed component $107_{A-C}$ and core component 109. Particularly, rather than immediately sending log records and space reservation to core component 109 when they are received from the clients, distributed components $107_{A-C}$ may buffer the log records and the space reservation. By buffering in distributed components $107_{A-C}$, virtual logging system 100 defers communications between the distributed components and the core component. Deferring and batching communication to the right moment reduces frequency of context switching and the communication latency overhead, resulting in significant improvement in the overall system performance.

However, because of the decoupling of distributed components $107_{A-C}$ and core component 109 as well as the reduction in communication between the components, distributed components $107_{A-C}$ may not be able to readily ascertain whether the amount of space remaining in transactional log 112 is sufficient for appending their log records. For example, distributed components $107_A$ may be buffering log records of its corresponding client, believing that space is available on transactional log 112 for appending the buffered log records. During this time, distributed components $107_B$ and $107_C$ may be sending log records to the core component 119, using up free space in transaction log 112. When distributed component $107_A$ sends its buffered log records to core component 109 some time later, transaction log 112 may not contain sufficient amount of free space for appending the log records, undo records, or compensation log records.

To ensure that there is sufficient space, common reserved space may be maintained in transactional log 112. Briefly stated, common reserved space is a portion of transactional log 112 that is reserved for clients serviced by the virtual logging system 100. In particular, the common reserved space is used to accommodate undo records and compensation log records for rolling back transactions, and log records of a client that have already been buffered by the client's corresponding distributed component.

Common reserved space is maintained by core component 109. In one embodiment of the invention, core component 109 is configured to allocate a part of the common reserved space in the transactional log for all of its clients. Each of the distributed components $107_{A-C}$ maintains accounting information that identifies its portion of the common reserved space for use as reserved space and pre-reserved space. The distributed components $107_{A-C}$ may communicate the accounting information to the core component so that the core component may use the portion of common reserved space for meeting the distributed components' requests, if necessary. The utilization of common reserved space will be discussed in more detail in conjunction with FIGS. 3 and 4.

Figure 3:
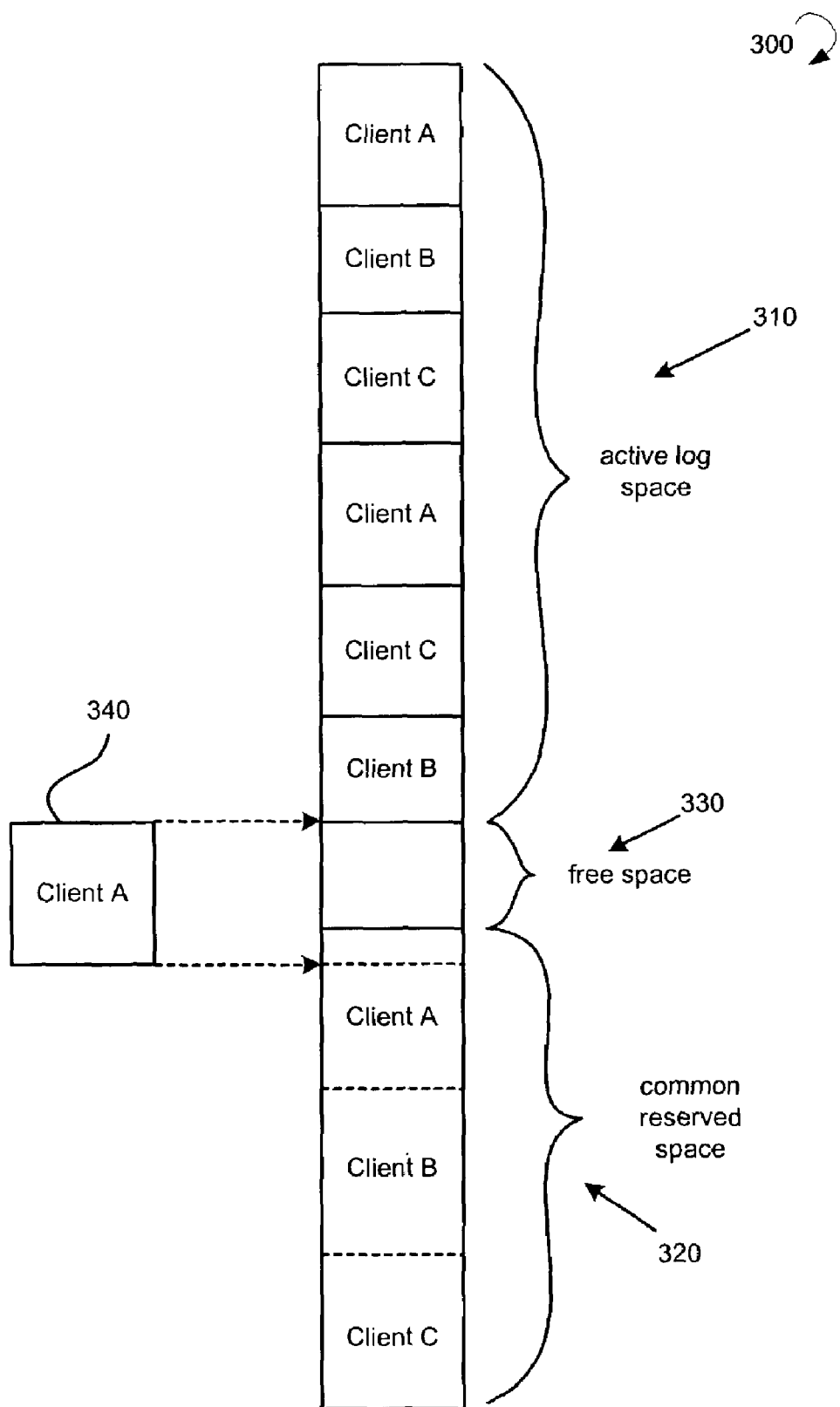
FIG. 3 is a graphical illustration of an exemplary transactional log.

FIG. 3 is a graphical illustration of an exemplary transactional log 300 including reserved space. Transactional log 300 may contain space allocated by a file system. As discussed above, log records from multiple clients may be stored in the transactional log 300. In this example, transactional log 300 contains log records from clients A, B, and C.

Active log space 310 is a portion of transactional log 300 where actual log records are stored. Log records from clients A, B, and C are multiplexed by a virtual logging system and written in transactional log 300. Free space 330 is the remaining portion of transactional log 300 that does not contain actual log records and is not reserved for clients.

Common reserved space 320 is a portion of transactional log 300 that is reserved for clients A-C. Core component of a virtual logging system keeps track of the common reserved space 320. Each distributed component of the virtual logging system maintains accounting information that identifies its portion of common reserved space 320. In addition, the accounting information also specifies the reserved space amount and the pre-reserved space amount within the client's portion of common reserved space 320.

In practice, each distributed component may use its portion of the common reserved space 320 that it accounts for as reserved space to append undo records and compensation log records for rolling back transactions. The distributed component may also use the portion of common reserved space that it accounts for as pre-reserved space to guarantee buffered append and reserve. In other words, once a client has received a representation from its corresponding distributed component that the client's log records and space reservation have been appended to the client's dedicated log (virtual log), the pre-reserved space ensures that sufficient space will be available for the log records in the transactional log. Though the use of pre-reserved space, this assurance is attained without constant communication between the distributed component and the core component.

As shown in the figure, each of clients A, B, and C has a portion of common reserved space 320 associated with the client in transactional log 300. It is to be appreciated that the distributed components account for their own portions of the common reserved space 320 and the core component does not need to maintain this accounting information. Also, the portion of common reserved space that belongs to one distributed component cannot be shared or used by another distributed component. However, the distributed components may relinquish any amount of its portion of the common reserved space 320. The amount of the client's common reserved space that it accounts for as pre-reserved space may be related to the size of the buffer used by the client's corresponding distributed component. In one example, one distributed component may request pre-reserved space equal in amount to the size of its associated buffer. In this way, it will be possible to append at least one full buffer of data to the log. According to one embodiment of the invention, a distributed component may request pre-reserved space that results in the growth of its buffer space. The buffer space may grow linearly or exponentially with each reservation fault.

For illustrative purposes, log records 340 of client A are to be appended to transactional log 300. It is to be understood that log records from different clients may be appended to transactional log 300 concurrently in a single batch. As indicated in the figure, there is not sufficient free space 330 to append log records 340. In this case, reserved space 320 is used for appending log records. Several other situations for appending log records and reserving log space are possible and will be discussed in conjunction with FIG. 4.

Figure 4:
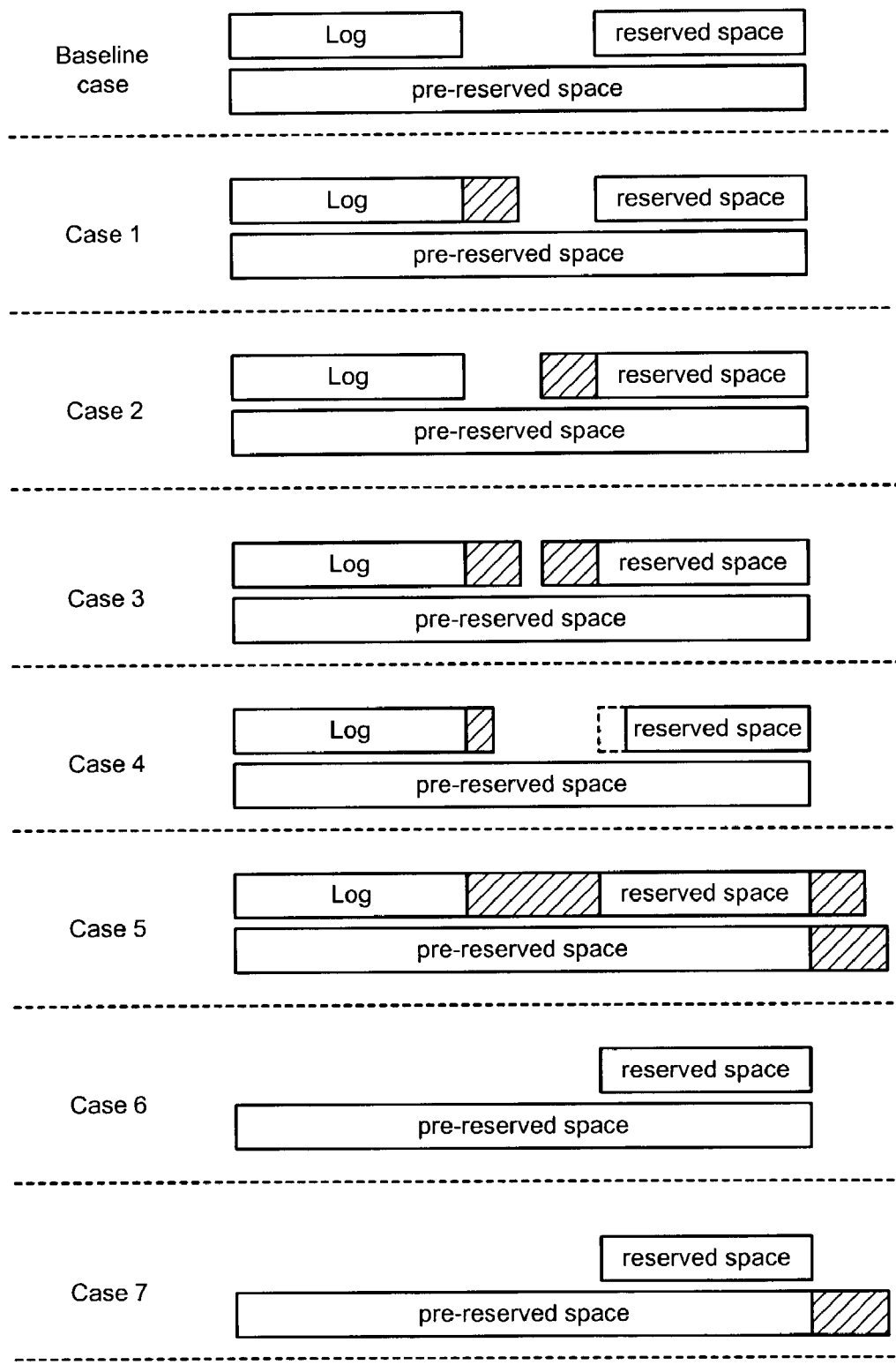
FIG. 4 is a schematic diagram illustrating log space usage in several exemplary cases where log records and log space reservation are buffered.

FIG. 4 is a schematic diagram illustrating log space usage in several exemplary cases where log records and log space reservation are buffered. In particular, the diagram illustrates how log space is used by a distributed component in seven specific cases. In each illustrated case, the amount of log space used by the distributed component is represented by three bars. The first bar represents the amount of space that is used for buffered log records. The second bar represents the amount of space that is reserved for undo records and compensation log records. The third bar represents the amount of pre-reserved space allocated to the client that is served by the distributed component.

In the Baseline case, the distributed component has received log records and log space reservation from its client that require certain amount of log space. The distributed component has also been allocated by a core component a portion of the transactional log as pre-reserved space. As shown in the figure, the amount of pre-reserved space is less than the sum of the amount of log space and reserved space so that the entire buffer of the distributed component may be appended to the transactional log at any time, using pre-reserved space if necessary. The seven exemplary cases shown in the figure will be compared to the Baseline case.

In Case 1, the distributed component has received additional log records from its client. As a result, the amount of log space increases relative to the baseline amount. In Case 2, the distributed component has received additional space reservation from the client. The reserved space is increased relative to the baseline amount. Case 3 is a combination of Cases 1 and 2, where the distributed component has received additional log records as well as additional space reservation from the client. In Cases 1, 2 and 3, despite the increases in space usage, the total amount of log space and reserved space is still less than the amount of pre-reserved space. Thus, the distributed component may honor the client's append and reserve requests without communicating and interacting with the core component.

For Case 4, the distributed component has received log records from the client with instructions to append the log records using the client's reserved space. This case may occur if the log records are undo records or compensation log records. As shown in the figure, the amount of log space is increased due to the new log records while the amount of reserved space is decreased by a corresponding amount.

In Case 5, the distributed component has received log records and reservation requests in an amount that will cause the total amount of space usage to exceed the amount of the client's pre-reserved space. In this case, the distributed component must increase the amount of pre-reserved space by requesting from the core component an increase of its portion of the common reserved space in the transactional log. As shown in the figure, the distributed component may obtain an increase in pre-reserved space in an amount greater than necessary for the immediate append and reserve request.

Case 6 occurs when the log records buffered in the distributed component are sent to the core component for appending to the transactional log. In this case, the amount of log space is reduced to zero while the amount of reserved space remains the same as those of the previous level. The amount of pre-reserved space is set back to the original amount even if the pre-reserved space reservation is increased for appending additional log records and space reservation, as in Case 5. Case 7 is similar to case 6, except that the core component has allocated more reserved space in the transaction log to the client to accommodate the corresponding distributed component's desired pre-reserved space. Desired pre-reserved space will be discussed in more detail in conjunction with FIG. 5.

Figure 5:
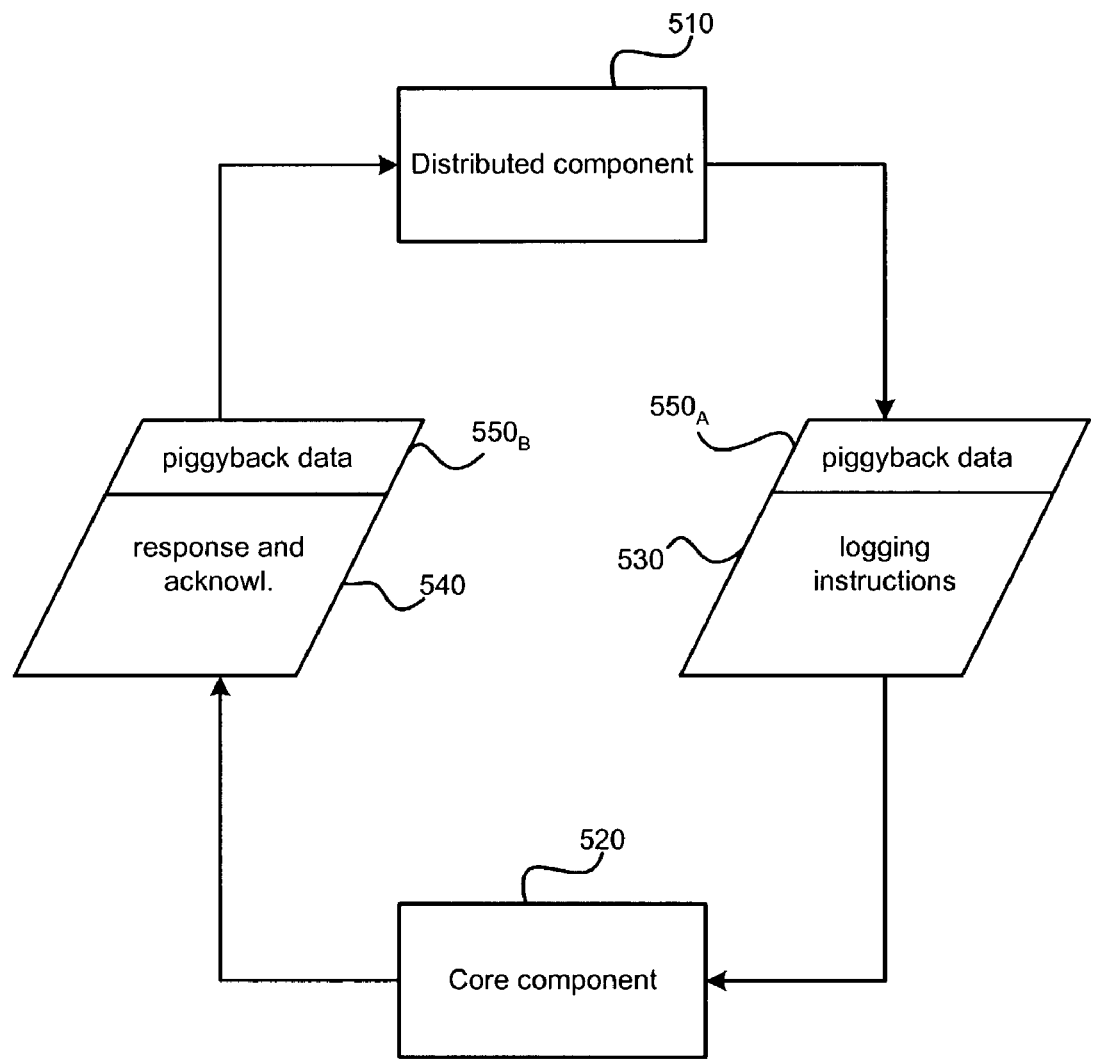
FIG. 5 is a graphical representation of exemplary logging communications between a distributed component and a core component of a virtual logging system.

FIG. 5 is a graphical representation of exemplary logging communications between a distributed component 510 and a core component 520 of a virtual logging system. Logging communications between distributed component 510 and core component 520 occurs when the distributed component 510 and the core component 520 exchange logging messages, such as logging instructions 530 or response 540. Logging instructions may include log records and other information related to logging.

Whenever logging communications occur between distributed component 510 and core component 520, piggyback data $550_{A-B}$ may be sent. Piggyback data $550_{A-B}$ are a small amount of accounting data sent along with logging communications. By including piggyback data $550_{A-B}$ on existing log messages, communication may be sent between distributed component 510 and core component 520 without incurring the extra I/O overhead associated with crossing either the machine/machine boundary or the user/kernel boundary.

As shown in the figure, on communications with logging instructions, distributed component 510 also sends piggyback data $550_A$ that contain accounting data regarding an amount of current pre-reserved space and an amount of desired pre-reserved space. The amount of current pre-reserved space is the amount of pre-reserved space that is currently allocated to the distributed component 510 by the core component 520. The amount of desired pre-reserved space is an amount of space in the transactional log that the distributed component 510 (and its corresponding client) would like to have pre-reserved. The amount of desired pre-reserved space ensures that there is sufficient space in a transactional log to store as much of the client's log records as distributed component 510 is capable of buffering.

Figure 7:
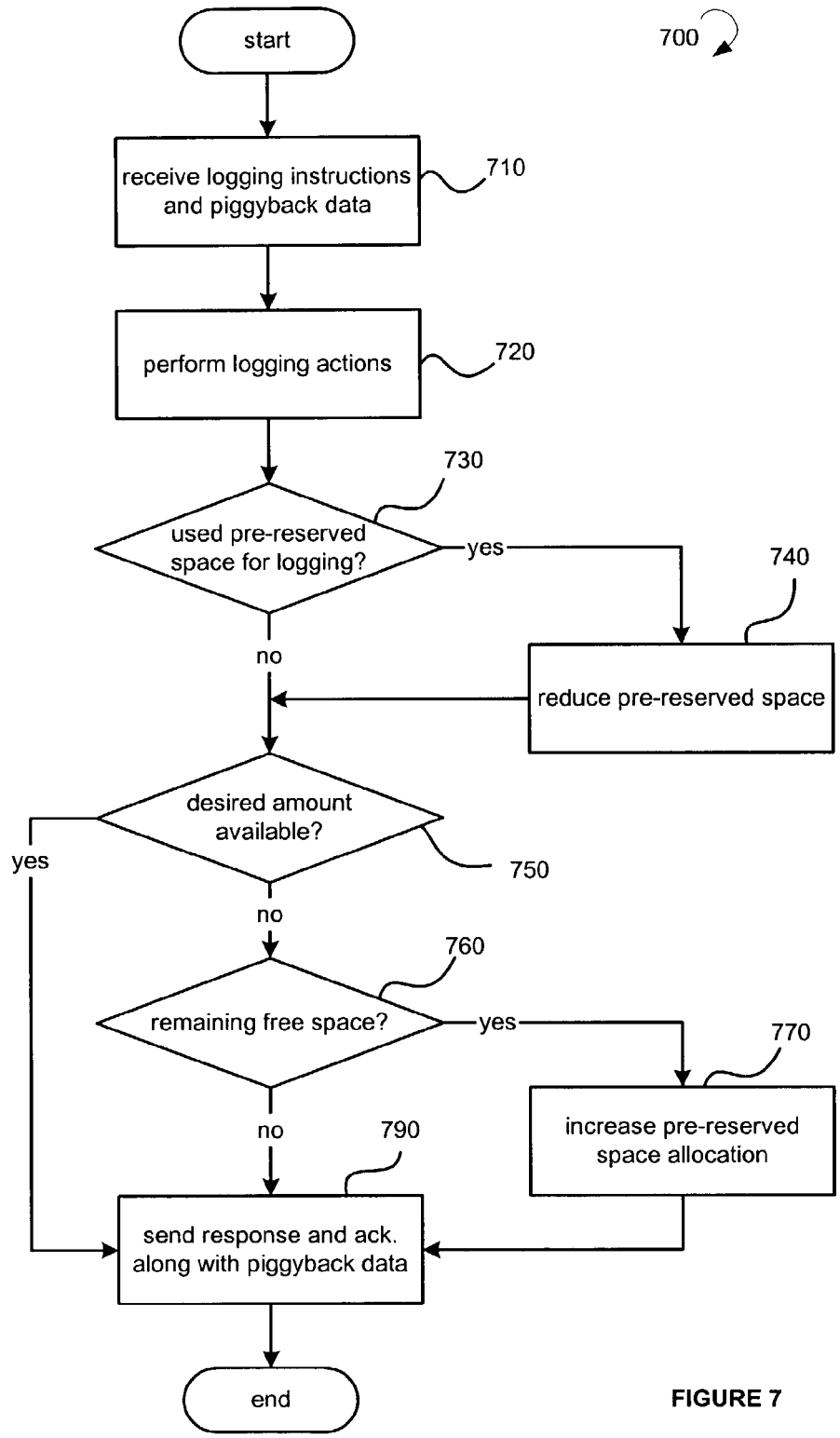
FIG. 7 is an operational flow diagram generally illustrating an exemplary process for determining an actual amount of pre-reserved space associated with a client.

When core component 520 received piggyback data $550_A$ from distributed component 510, it ascertains the amount of free space in the transactional log and determines the actual amount of pre-reserved space using a process described in FIG. 7. Briefly stated, core component 520 determines the actual amount of pre-reserved space by considering the amount of free space remaining in the transactional log, the client's desired amount of pre-reserved space, and other factors.

Core component 520 sends piggyback data $550_B$ on response and acknowledgement communication sent to distributed component 510 in response to logging instructions. The piggyback data $550_B$ may contain accounting data regarding the actual amount of pre-reserved space available to the client.

When distributed component 510 receives piggyback data $550_B$, it takes the updated accounting data (the actual amount of pre-reserved space) in the piggyback data $550_B$ into account in determining how many log records the distributed component can buffer. The updating of accounting data using piggyback data $550_{A-B}$ forms a feedback loop that allows distributed component 510 to maintain updated accounting information without incurring an excessive amount of communication overhead between distributed component 510 and core component 520.

Figure 6:
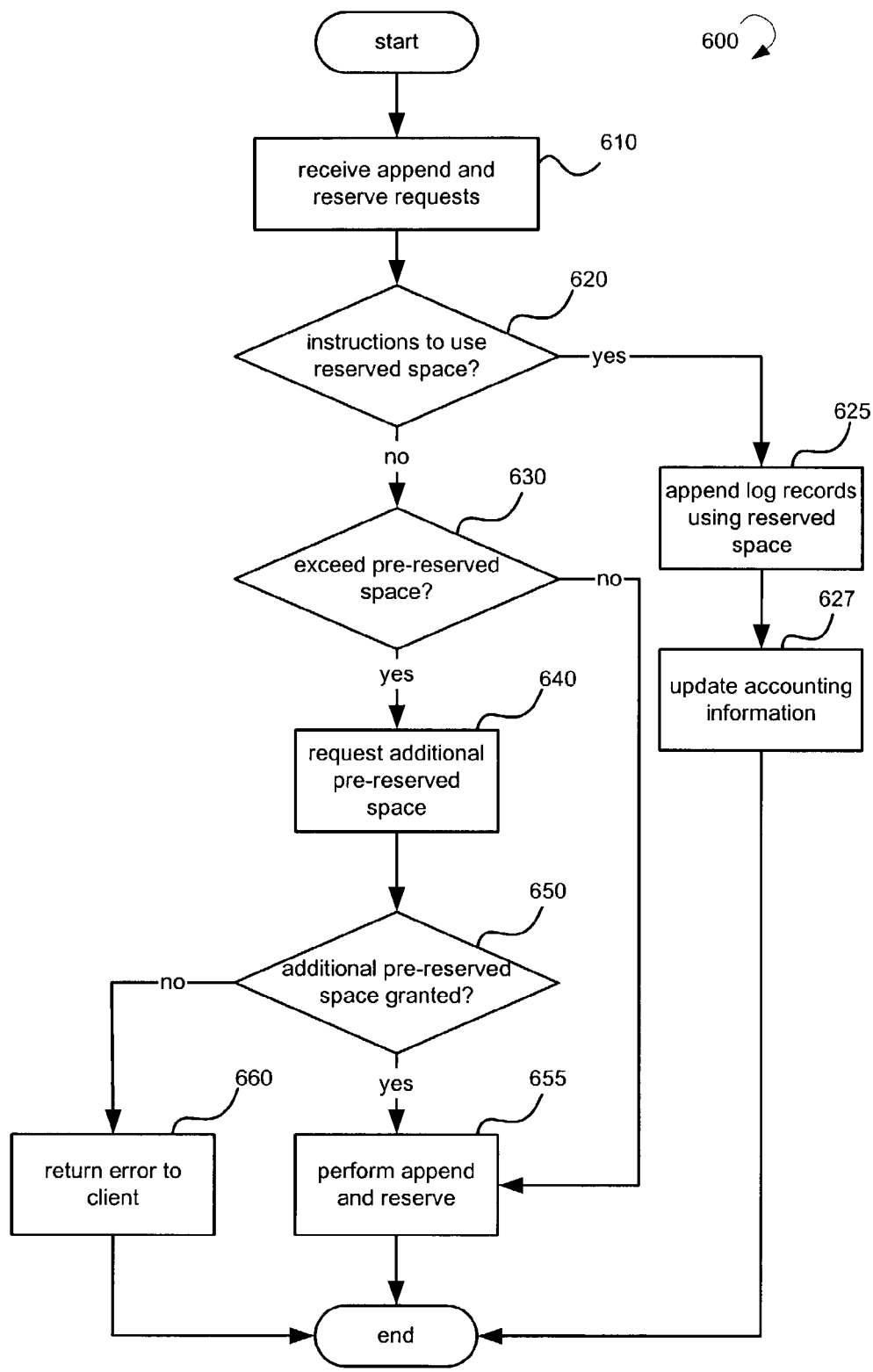
FIG. 6 is an operational flow diagram generally illustrating an exemplary process for buffering log records and space reservation for a client.

FIG. 6 is an operational flow diagram generally illustrating an exemplary process 600 that may be used by a distributed component for buffering log records and space reservation for a client. Process 600 moves from a start block to 610 where a request is received from the client to append log records, space reservation, or both.

At decision block 620, a determination is made whether the distributed component is instructed to perform the append and reserve request using the client's reserved space. If so, process 600 continues at block 625 where the log records are appended using the client's reserved space. Then, the process moves to block 627 where the accounting information of the distributed component is updated by decreasing the amount of reserved space used for performing the append and reserve request.

Returning to decision block 620, if the distributed component is not instructed to perform the append and reserve request using reserved space, process 600 moves to decision block 630 where a determination is made whether the append and reserve request requires an amount of space greater than the amount of available pre-reserved space. If not, the process goes to block 655 where the append and reserve request is performed and the process ends.

Otherwise, the amount of pre-reserved space is not enough for the append and reserved request and process 600 continues at block 640. At block 640, a request to the core component is made to obtain additional pre-reserved space. At decision, block 650, a determination is made whether the request for additional pre-reserved space is granted by the core component. If so, the append and reserved request is performed at block 655 and the process ends. Otherwise, the append and reserve request cannot be performed due to insufficient pre-reserved space. At block 660, an error is returned to the client and the process ends.

FIG. 7 is an operational flow diagram generally illustrating an exemplary process 700 that may be used by a core component for determining an actual amount of pre-reserved space associated with a client. Process 700 enters at a start block. At block 710, logging instructions with piggyback data are received. The piggyback data includes accounting information identifying the amount of current pre-reserved space and an amount of desired pre-reserved space associated with the client.

Moving to block 720, logging actions are performed in accordance with the logging instructions. Logging actions may include multiplexing the client's log records contained in the logging instructions, appending the multiplexed log records to a transactional log, or the like. Process 700 then moves to decision block 730.

At decision block 730, a determination is made whether the logging actions were performed using pre-reserved space available to the client. The use of pre-reserved space is necessary if sufficient free space is not available in the transactional log for appending the client's log records.

If the logging actions were not performed using the client's pre-reserved space, process 700 continues at decision block 750. However, if the logging actions were performed using the client's pre-reserved space, at block 740, the amount of pre-reserved space available to the client is reduced by the amount that was used by the logging actions, and the process 700 moves to decision block 750.

At decision block 750, a determination is made whether the amount of desired pre-reserved space (as identified in the piggyback data) is available to the client. If so, the amount of the client's pre-reserved space may not be increased any further and process 700 goes to block 790. If the desired amount of pre-reserved space is not available to the client, process 700 moves to decision block 760 where a determination is made whether sufficient free space remains in the transactional log to allocate more pre-reserved space to the client. If not, the client pre-reserved space cannot be increased and process 700 goes to 790.

If there is sufficient free space in the transactional log, process 700 moves to block 770 where the amount of pre-reserved space associated with the client is increased to meet as much as possible the client's desired amount of pre-reserved space. The pre-reserved space allocation is increased using free space in the transactional log, which may become available if another client's active log space and pre-reservation space are no longer needed. Process 700 then moves to block 790.

At block 790, piggyback data with accounting information regarding the actual amount of pre-reserved space available to the client is returned, along with a response and acknowledgment communication to the distributed component. The actual amount of pre-reserved space allocation is calculated by taking into account any reduction and increase in pre-reserved space associated with the client. Then, process 700 ends.

The above specification, examples and data provide a complete description of the invention. Since many embodiments of the invention can be made without departing from the spirit and scope of the invention, the invention resides in the claims hereinafter appended.

What is claimed is:

1. A transactional logging system comprising:
    at least two computing devices including clients; wherein the clients include a first client that is associated with a first application having a first functionality and a second client that is associated with a second application having a second functionality;
    a transactional log containing storage space associated with a storage unit; wherein the transactional log stores log records from the clients;
    wherein the transactional log is presented to each of the clients as a dedicated logging system such that each client expects that the log records received from each of the clients is stored within a dedicated log; and
    wherein each of the clients has a portion of a common reserved space within the transactional log;
    wherein the common reserved space is used to accommodate undo records and compensation log records for rolling back transactions, and log records of a client that have been buffered by a client's corresponding distributed component; and wherein the transactional log stores log records from the first client and the second client;
    wherein the log records from the first client are unrelated to the log records from the second client; wherein the log records from the clients are multiplexed;
    a core component configured to: manage the transactional log for a plurality of clients;
    allocate a part of the transactional log as common reserved space for use by the clients;
    keep track of the common reserved space; and write log records to the transactional log;
    wherein the core component operates in a kernel mode of a computer and wherein the core component is further configured to determine an amount of actual pre-reserved space to allocate to the client and to communicate the amount of actual pre-reserved space to the distributed component; wherein the amount of actual pre-reserved space is communicated to the distributed component using piggyback data; and
    a plurality of distributed components configured to buffer the log records from the plurality of clients before sending the log records to the core component, wherein buffering the log record defers communication with the core component in order to save overhead associated with communications crossing a user-kernel boundary; each distributed component being associated with at least one of the clients, the distributed component being further configured to maintain accounting information for identifying the portion of the common reserved space associated with the client and to communicate the accounting information to the core component; wherein the distributed components operate in either a kernel mode or in a user mode.

2. The transactional logging system of claim 1, wherein the accounting information further comprises an amount of current pre-reserved space and an amount of desired pre-reserved space, and wherein the distributed component is further configured to request the amount of desired pre-reserved space from the core component.

3. The transactional logging system of claim 1, wherein the accounting information maintained by the distributed component is uniquely known to the distributed component before being communicated to the core component.

4. The transactional logging system of claim 1, wherein the accounting information is communicated to the core component as piggyback data.

5. The transactional logging system of claim 1, wherein the core component is further configured to append the log records associated with at least one client using the portion of the pre-reserved space that belongs to the client.

6. The transactional logging system of claim 1, wherein the distributed component is further configured to relinquish reserved space that belongs to the distributed component.

7. A method for managing a transactional log, comprising:
    utilizing a core component to:
    manage a transactional log for a plurality of clients;
    wherein the transactional log contains storage space associated with a storage unit;
    wherein the transactional log stores log records from the clients; wherein the clients include a first client that is associated with a first application having a first functionality and a second client that is associated with a second application having a second functionality;
    wherein the transactional log is presented to each of the clients as a dedicated logging system such that each client expects that the log records received from each of the clients is stored within a dedicated log; and wherein each of the clients has a portion of a common reserved space within the transactional log;
    wherein the common reserved space is used to accommodate undo records and compensation log records for rolling back transactions, and log records of a client that have been buffered by a client's corresponding distributed component; and wherein the transactional log stores log records from the first client and the second client;
    wherein the log records from the first client are unrelated to the log records from the second client;
    wherein the log records from the clients are multiplexed;
    allocate a part of the transactional log as common reserved space for use by the clients;
    keeping track of the common reserved space; and write log records to the transactional log;

wherein the core component operates in a kernel mode of a computer;

determine an amount of actual pre-reserved space to allocate to the client and to communicate the amount of actual pre-reserved space to the distributed component wherein the amount of actual pre-reserved space is communicated to the distributed component using piggyback data; and utilizing a plurality of distributed components to:

buffer the log records from the plurality of clients before sending the log records to the core component, wherein buffering the log record defers communication with the core component in order to save overhead associated with communications crossing a user-kernel boundary; each distributed component being associated with at least one of the clients, the distributed component being further configured to maintain accounting information for identifying the portion of the common reserved space associated with the client and to communicate the accounting information to the core component; wherein the distributed components operate in either a kernel mode or in a user mode.

8. The method of claim 7, wherein the accounting information further comprises an amount of current pre-reserved space and an amount of desired pre-reserved space, and wherein the distributed component is further configured to request the amount of desired pre-reserved space from the core component.

9. The method of claim 7, wherein the accounting information maintained by the distributed component is uniquely known to the distributed component before being communicated to the core component.

10. The method of claim 7, wherein the accounting information is communicated to the core component as piggyback data.

11. The method of claim 7, wherein the core component is further configured to append the log records associated with at least one client using the portion of the pre-reserved space that belongs to the client.

12. The method of claim 7, wherein the distributed component is further configured to relinquish reserved space that belongs to the distributed component.

13. A computer-readable storage medium containing computer-executable instructions which, when executed by a computer, manages a transactional log, comprising:

utilizing a core component to:

manage a transactional log for a plurality of clients;

wherein the transactional log contains storage space associated with a storage unit;

wherein the transactional log stores log records from the clients; wherein the clients include a first client that is associated with a first application having a first functionality and a second client that is associated with a second application having a second functionality;

wherein the transactional log is presented to each of the clients as a dedicated logging system such that each client expects that the log records received from each of the clients is stored within a dedicated log; and wherein each of the clients has a portion of a common reserved space within the transactional log;

wherein the common reserved space is used to accommodate undo records and compensation log records for rolling back transactions, and log records of a client that have been buffered by a client's corresponding distributed component; and wherein the transactional log stores log records from the first client and the second client;

wherein the log records from the first client are unrelated to the log records from the second client;

wherein the log records from the clients are multiplexed;

allocate a part of the transactional log as common reserved space for use by the clients;

keeping track of the common reserved space; and write log records to the transactional log;

wherein the core component operates in a kernel mode of a computer;

determine an amount of actual pre-reserved space to allocate to the client and to communicate the amount of actual pre-reserved space to the distributed component wherein the amount of actual pre-reserved space is communicated to the distributed component using piggyback data; and utilize a plurality of distributed components:

buffer the log records from the plurality of clients before sending the log records to the core component, wherein buffering the log record defers communication with the core component in order to save overhead associated with communications crossing a user-kernel boundary; each distributed component being associated with at least one of the clients, the distributed component being further configured to maintain accounting information for identifying the portion of the common reserved space associated with the client and to communicate the accounting information to the core component; wherein the distributed components operate in either a kernel mode or in a user mode.

14. The computer-readable storage medium of claim 13, wherein the accounting information further comprises an amount of current pre-reserved space and an amount of desired pre-reserved space, and wherein the distributed component is further configured to request the amount of desired pre-reserved space from the core component.

15. The computer-readable storage medium of claim 13, wherein the accounting information maintained by the distributed component is uniquely known to the distributed component before being communicated to the core component.

16. The computer-readable storage medium of claim 13, wherein the accounting information is communicated to the core component as piggyback data.

17. The computer-readable storage medium of claim 13, wherein the core component is further configured to append the log records associated with at least one client using the portion of the pre-reserved space that belongs to the client.

18. The computer-readable storage medium of claim 13, wherein the distributed component is further configured to relinquish reserved space that belongs to the distributed component.

* * * * *